United States Patent
Liu et al.

(10) Patent No.: US 9,239,881 B2
(45) Date of Patent: *Jan. 19, 2016

(54) INTERACTIVE WEB CRAWLER

(71) Applicant: Microsoft Corporation, Redmond, WA (US)

(72) Inventors: Chao Liu, Redmond, WA (US); Chao Zhou, Redmond, WA (US); Yi-Min Wang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 126 days.

This patent is subject to a terminal disclaimer.

(21) Appl. No.: 13/970,577

(22) Filed: Aug. 19, 2013

(65) Prior Publication Data
US 2013/0339336 A1    Dec. 19, 2013

Related U.S. Application Data

(63) Continuation of application No. 13/163,001, filed on Jun. 17, 2011, now Pat. No. 8,538,949.

(51) Int. Cl.
*G06F 17/30* (2006.01)
*G06F 3/0482* (2013.01)

(52) U.S. Cl.
CPC ........ *G06F 17/30864* (2013.01); *G06F 3/0482* (2013.01)

(58) Field of Classification Search
CPC .............. G06F 3/0482; G06F 3/04847; G06F 17/30864
See application file for complete search history.

(56) References Cited

U.S. PATENT DOCUMENTS

| 7,596,804 | B2 | 9/2009 | Toomey et al. |
| 7,685,112 | B2 | 3/2010 | Ntoulas et al. |
| 7,716,322 | B2 * | 5/2010 | Benedikt et al. ............ 709/224 |
| 8,078,960 | B2 | 12/2011 | Chalecki et al. |
| 8,538,949 | B2 * | 9/2013 | Liu et al. ........................ 707/709 |
| 2005/0216356 | A1 | 9/2005 | Pearce et al. |
| 2005/0256832 | A1 * | 11/2005 | Zhang et al. ..................... 707/1 |
| 2006/0136309 | A1 * | 6/2006 | Horn et al. ...................... 705/26 |
| 2006/0230033 | A1 | 10/2006 | Halevy et al. |
| 2007/0022085 | A1 * | 1/2007 | Kulkarni ........................... 707/1 |

(Continued)

OTHER PUBLICATIONS

Lage, et al., "Collecting hidden web pages for data extraction", Retrieved at <<http://homepages.dcc.ufmg.br/~palmieri/drafts/lage02collecting.pdf>>, Nov. 4-9, 2002, pp. 7.

(Continued)

*Primary Examiner* — Leslie Wong
(74) *Attorney, Agent, or Firm* — Sandy Swain; Judy Yee; Micky Minhas

(57) ABSTRACT

The claimed subject matter provides a system or method for web crawling hidden files. An exemplary method includes loading a web page with a browser agent, and executing any dynamic elements hosted on the web page using the browser agent to insert pre-determined values. A list of form controls may be retrieved from the web page using the browser agent, and the controls may be analyzed using a driver component. Form control values may be sent from the driver component to the browser agent, and an event may be submitted to the web page by the browser agent or scripted content may be run to trigger operations on the web page corresponding to the form control values. A URL may be generated for various form control values using a generalizer.

18 Claims, 6 Drawing Sheets

(56) References Cited

U.S. PATENT DOCUMENTS

| | | |
|---|---|---|
| 2007/0112714 A1* | 5/2007 | Fairweather .................... 706/46 |
| 2007/0150387 A1* | 6/2007 | Seubert et al. ................. 705/31 |
| 2007/0244900 A1* | 10/2007 | Hopkins et al. ................ 707/10 |
| 2007/0282693 A1* | 12/2007 | Staib et al. ..................... 705/26 |
| 2007/0300161 A1* | 12/2007 | Bhatia et al. .................. 715/745 |
| 2009/0204610 A1* | 8/2009 | Hellstrom et al. ................ 707/5 |
| 2010/0299331 A1* | 11/2010 | Moricz ......................... 707/741 |
| 2011/0087646 A1 | 4/2011 | Dalvi et al. |
| 2011/0099467 A1 | 4/2011 | Kapur et al. |
| 2012/0143895 A1* | 6/2012 | Salvetti et al. ............... 707/769 |
| 2014/0230058 A1* | 8/2014 | Shulman et al. ................ 726/23 |

OTHER PUBLICATIONS

Benedikt, et al., "VeriWeb: Automatically Testing Dynamic Web Sites", Retrieved at <<http://www.cs.utah.edu/~juliana/pub/veriweb-www2002.pdf>>, 11th International World Wide Web Conference, Retrieved Date: Apr. 15, 2011, pp. 15.

Raghavan, et al., "Crawling the Hidden Web", Retrieved at <<http://www.dia.uniroma3.it/~vldbproc/017_129.pdf>>, Proceedings of the 27th International Conference on Very Large Data Bases, 2001, pp. 10.

* cited by examiner

400

INTERACTIVE WEB CRAWLER

CROSS-REFERENCE TO RELATED APPLICATIONS

This application is a continuation of co-pending U.S. patent application Ser No. 13/163,001, filed Jun. 17, 2011 (the entire contents of which are hereby incorporated by reference as though fully set forth herein).

BACKGROUND

Web indexing typically occurs when search engines collect and order data from the web to facilitate efficient information retrieval. Through the use of an index, a search engine may avoid scanning each and every document in a corpus and instead rely on the index to fulfill search queries. Typically, a web crawler begins the process of web indexing by fetching web pages. There are several types of crawlers, including static crawlers, dynamic crawlers, and interactive crawlers, as further described herein.

Traditional link-based crawlers that access web pages through outlinks of seed uniform resource locators (URLs) with static content may not access web pages that exist in the deep or hidden Web. The pages that lie within the hidden Web are accessible only after they are created dynamically as a result of some input to a web page, usually a web user filling and submitting web forms. There may be few hyperlinks to the pages that are generated as a result of a user filling and submitting web forms. Further, among pages that are generated as a result of a user filling and submitting web forms, few of them have hyperlinks pointing to them from general seed URLs. The hidden web may also include pages that are accessible only through links produced by scripted content such as JavaScript, Flash, or AJAX.

In order to index the hidden Web, some search engines introduce algorithms that generate queries for input in forms on a web page. The queries may be constructed by analyzing the static content of the web page and extracting keywords. A common technique is based on term frequency-inverse document frequency (TFIDF). The queries may be limited to default values if default values for a particular input or control exist. In this manner, only a small number of input combinations on non-scripted forms generate URLs for inclusion into the web index. Moreover, these generated URLs may contain a large number of invalid combinations, while dependent controls on non-scripted forms and dependencies between various controls may be ignored, leading to a large number of invalid web pages. The URLs that are found to be valid may be excluded based on a lack of distinction or low informativeness.

SUMMARY

The following presents a simplified summary of the innovation in order to provide a basic understanding of some aspects described herein. This summary is not an extensive overview of the claimed subject matter. It is intended to neither identify key nor critical elements of the claimed subject matter nor delineate the scope of the subject innovation. Its sole purpose is to present some concepts of the claimed subject matter in a simplified form as a prelude to the more detailed description that is presented later.

The subject innovation relates to web crawling hidden files. An exemplary method comprises loading a web page with a browser agent and executing dynamic elements hosted on the web page using the browser agent to insert pre-determined values. A list of form controls may be retrieved from the web page using the browser agent, and the controls may be analyzed using a driver component. Form control values may be sent from the driver component to the browser agent, and an event may be submitted to the web page by the browser agent or scripted content may be run to trigger operations on the web page corresponding to the form control values. A URL may be generated for various form control values using a generalizer.

An exemplary system relates to web crawling hidden files. One exemplary system comprises a processing unit and a system memory. The system memory, which comprises a computer-readable storage medium, stores code configured to direct the processing unit to load a web page with the browser agent module. Any dynamic elements hosted on the web page may be executed using the browser agent module to insert pre-determined values. A list of form controls may be retrieved from the web page using the browser agent module, and the controls may be analyzed using the driver component module. Form control values may be sent from the driver component module to the browser agent module, and a URL may be generated for various form control values using the generalizer module.

Another exemplary embodiment of the subject innovation provides one or more computer-readable storage media that includes code to direct the operation of a processing unit. The code may direct the processing unit to load a web page with a browser agent and execute any dynamic elements hosted on the web page using the browser agent to insert pre-determined values. A list of form controls may be retrieved from the web page using the browser agent, and the controls may be analyzed using a driver component. Form control values may be sent from the driver component to the browser agent, and a URL may be generated for various form control values using a generalizer.

The following description and the annexed drawings set forth in detail certain illustrative aspects of the claimed subject matter. These aspects are indicative, however, of but a few of the various ways in which the principles of the innovation may be employed, and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
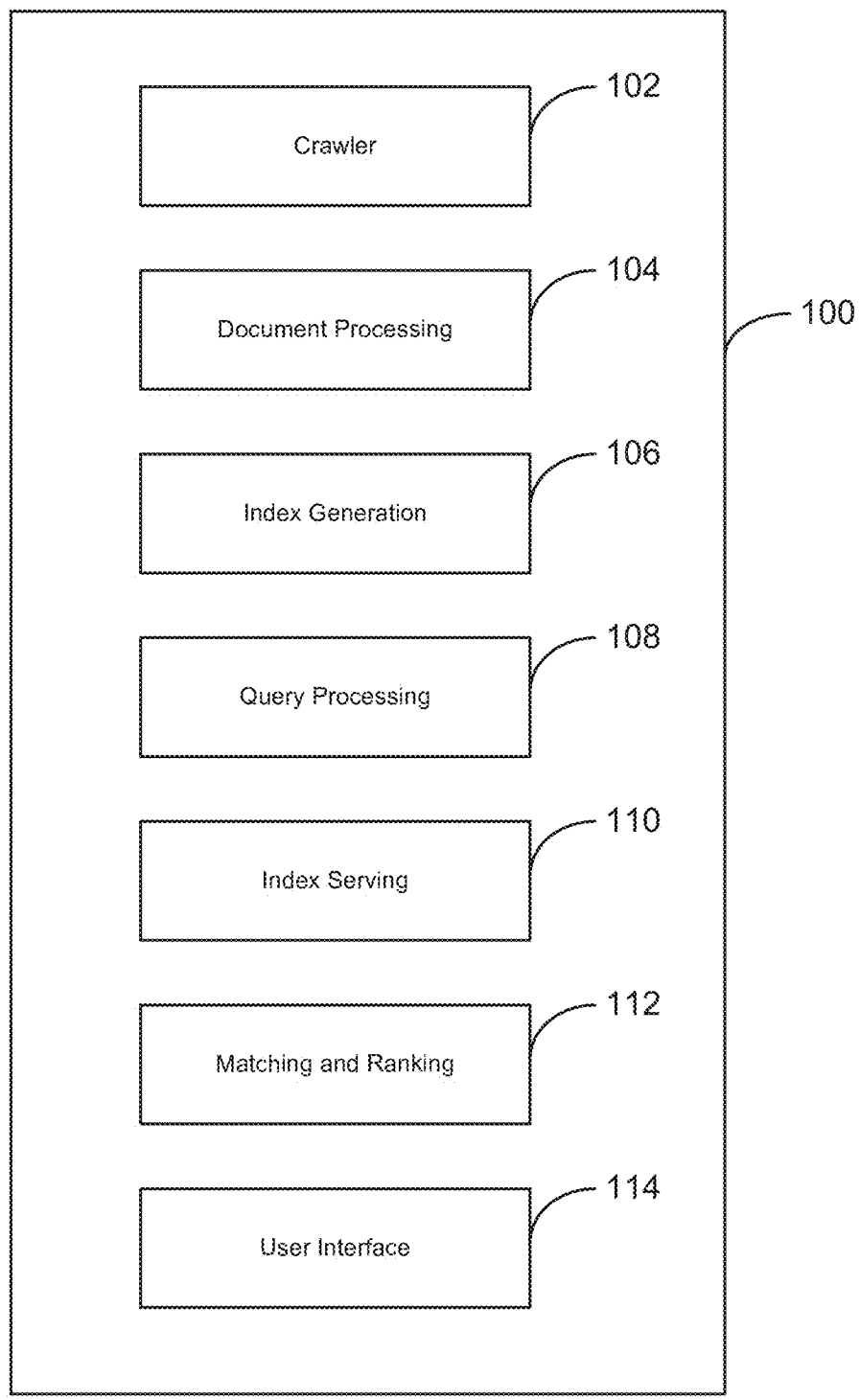
FIG. 1 is a block diagram of a search engine according to the subject innovation.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," and the like are intended to refer to a computer-related entity, either hardware, software (e.g., in execution), and/or firmware. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media, such as a computer-readable storage media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for electrical or electronic signals and the like.

Those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

The subject innovation relates to web crawling hidden files. The browser agent may be used to interactively fill in forms for retrieval of web content within the hidden Web. The use of a knowledge base to prioritize the crawling of hidden web content allows for intelligent web crawling. Additionally, the subject innovation may estimate the potential gain of each form control value setting under real world constraints.

FIG. 1 is a block diagram of a search engine 100 that provides web crawling of hidden files according to the subject innovation. The search engine 100 may use a crawler 102 to fetch web pages. The crawler may contain a discovery portion used to discover URLs, and a fetching portion used to fetch URLs. Crawlers may generally be classified into three categories: static, dynamic, and interactive.

A traditional, static crawler may extract or compute a possible URL for the web page based on static hypertext markup language (HTML) analysis, fetch content for a given URL, and store the content from the URL. The static crawler may extract an outgoing URL on the HTML source of the web page. When computing a URL, the static crawler may compute a possible URL by concatenating several query parameters as indicated on the static HTML source of the web page. However, query parameters may contain empty values, and web masters may include fake information within values of query parameters in static HTML source of the web page. Thus, the computed URLs may be unreliable. A dynamic crawler may compute a possible URL for a web page, fetch static content for the URL, and execute various dynamic components of the web page one time. Each form control on the web page may be loaded with a default value, if possible, and content rendered from the computed URL may be stored along with the dynamically loaded values. With a dynamic crawler, forms may not be identified and dependent controls may not be loaded. However, an interactive crawler may identify forms on the web page. An interactive crawler may fetch the static content of a URL, execute various dynamic components of the web page one time, identify any forms to be filled, and fill the form controls. After one form control is filled, various dynamic components may be executed interactively based on a driver, and rendered content from the URL may be stored.

The search engine may perform document processing 104 by processing content rendered by the crawler 102 in order to prepare the content for indexing. Processing the content may include normalizing various document formats and forms within the rendered content. Additionally, the search engine may perform index generation 106 by generating an index based on the rendered content. Query processing 108 may be performed by the search engine in order to process a query to the search engine. Processing the query may include defining misspelled or vague queries. The search engine may perform index serving 110 by gathering all rendered content related to the query. Matching and ranking 112 may be performed on the gathered content. A user interface 114 may be used to display the matched and ranked content from the search engine. The user interface 114 may also be used to input queries into the search engine 100.

Figure 2:
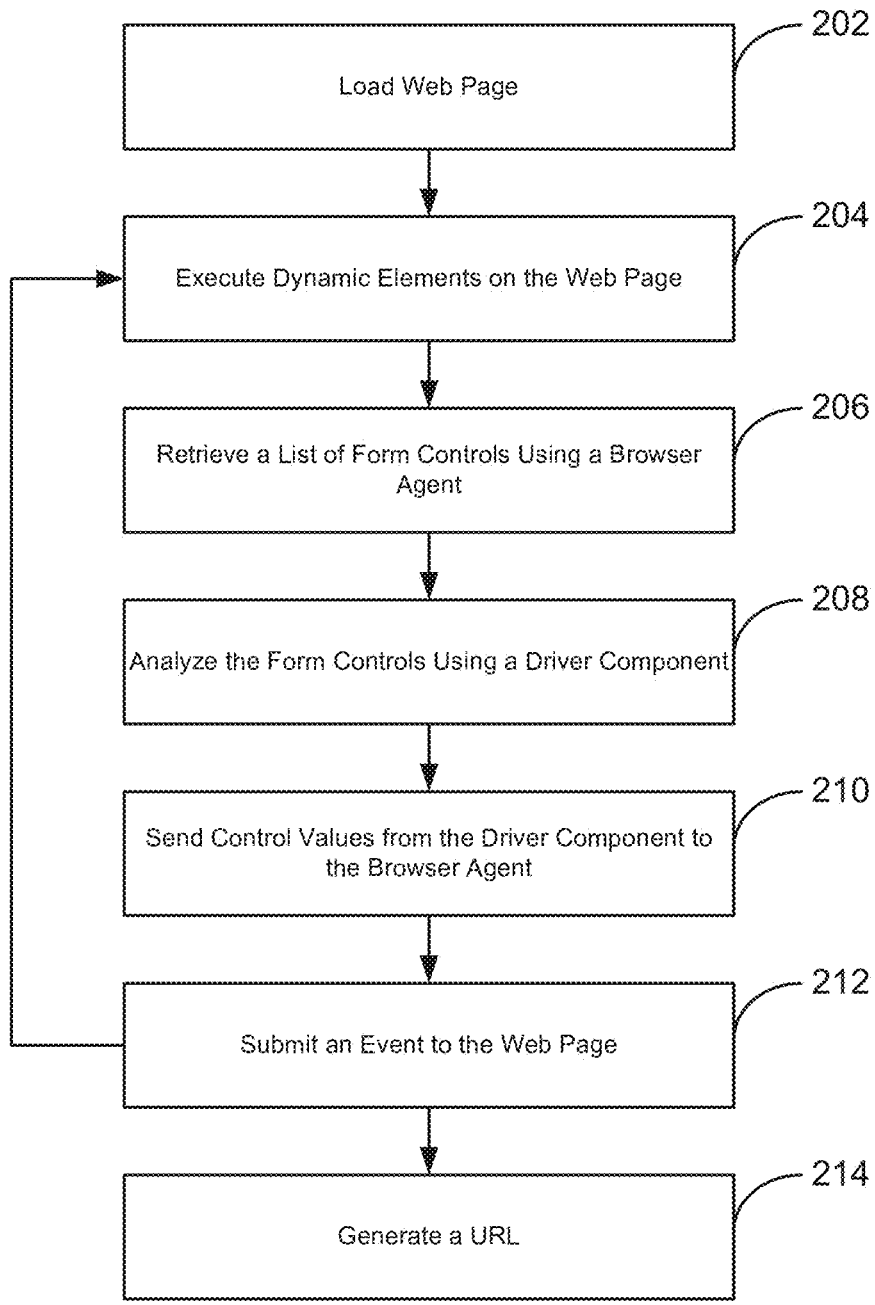
FIG. 2 is a process flow diagram of a method that provides web crawling of hidden files according to the subject innovation.

FIG. 2 is a process flow diagram of a method 200 that provides web crawling of hidden files according to the subject innovation. At block 202, a web page is loaded. The web page may be loaded a browser agent. At block 204, dynamic elements on the web page are executed. The execution occurs similar to a human being browsing the web page and selecting values for various forms and dynamic elements on the page. In this manner, forms that do not exist on the static HTML may be revealed. Further, the dynamic elements on the web page may be executed using a browser agent to insert pre-determined values into the dynamic elements. The pre-determined values may be provided by the knowledge base as described herein.

At block 206, a list of form controls is retrieved. The list of form controls may be retrieved from the web page using the browser agent, and may include the preset values, if any, of each form control as well as a list of candidate values for each form control, if available. Additionally, candidate values for each form control that does not exist on the static HTML may be revealed.

At block 208, the form controls are analyzed. The form controls may be analyzed using a driver component, which may include a utility estimator that estimates the expected utility gain for each value setting and determines whether the parameter filling should be stopped. Generally, the utility estimator estimates the expected utility gain for each value setting based on knowledge base and site-dependent features. The utility estimator may also estimate the expected utility gain of both a single value and a combination of values, and may be dynamically adapted using feedback knowledge. All languages and all domains may be used with the utility estimator, and the utility estimator may also consider history data, such as previous URLs generated from the form in previous executions.

The analysis performed by the driver component may include information about the form controls, including their positions, preset values, set values, and candidate values. Additionally, analysis of the form controls includes making a decision as to what value to set for the form controls. During the decision making process, the driver component may resort to a knowledge base to retrieve relevant knowledge to direct its decision making. The knowledge base can contain N-grams built from search query logs, which may be used to prioritize which value to set for each form control. The knowledge base may also include other components used to direct its decision making. Through the use of the knowledge base, the driver component may consider real world constraints that are imposed by real world practice, such as the maximum number of URLs able to be generated for each site or maximum bandwidth limitations.

At block 210, form control values may be sent from the driver component to the browser agent. At block 212, an event is submitted to the web page. The even may be submitted by the browser agent to trigger operations on the web page corresponding to the form control values. Scripted content, such as JavaScript, Flash, or AJAX, may be executed locally within the web browser to trigger an event. Once the operations on the web page are complete, the browser agent may re-fetch the entire content of the web page, including the form control list and values for dependent form controls that were previously inactive. The operations may include refreshing the form control list or populating the candidate values for form controls that are previously not applicable. Process flow may then return to block 204 and execute any dynamic elements on the webpage, which may include the dependent form controls that were previously inactive. Blocks 204-212 may be repeated until some constraints have been met, such as the real world constraints discussed herein or until all form controls have been executed. In this manner, form controls may be interactively filled and executed using values for the form controls that have been pre-determined by a component such as the knowledge base.

At block 214, a URL is generated for various form control values using a generalizer. The generalizer may also provide a seed URL for a crawler. The driver component may output the URL to an output file, or streamline the URL to a downstream component. At the same time, the generalizer may attempt to generate a URL pattern based the URLs previously generated. In addition to directly generating the URLs within constraints recognized by the driver component, the generalizer may use sample URLs to generate other valid URLs through generalizations made from analyzing the samples. The generalizer may also send user feedback to the knowledge base for use in subsequent iterations. In this manner, other URLs may be iteratively generated until all controls and their dependent controls have been analyzed, or until some other constraint has been achieved, such as a certain number of URLs have been obtained, or until all resources have been used, such as time.

Figure 3:
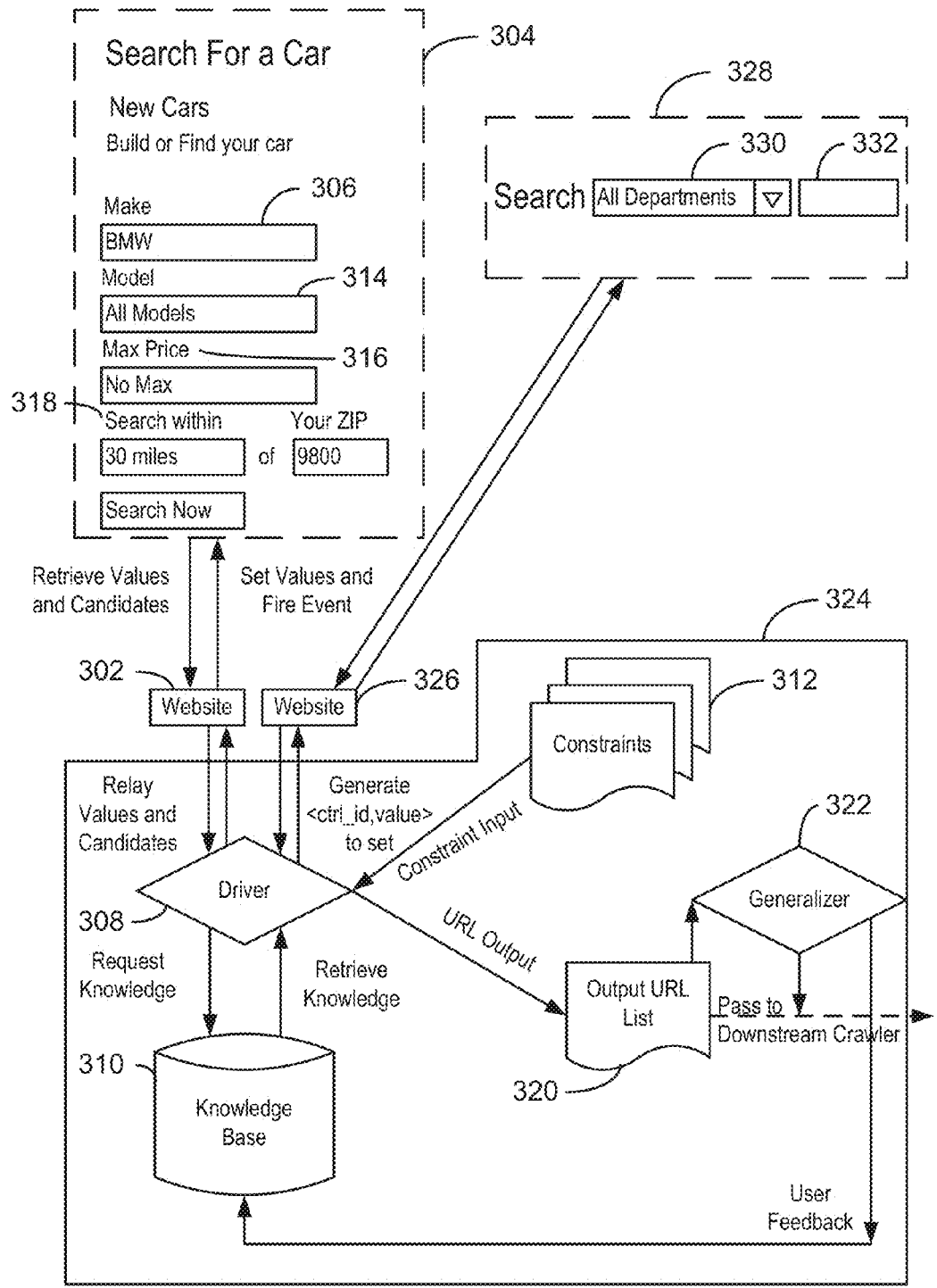
FIG. 3 is a block diagram that is useful in explaining web crawling of hidden files according to the subject innovation.

FIG. 3 is a block diagram 300 that is useful in explaining web crawling hidden files according to the subject innovation. A browser agent may be used to load a web page 302 to analyze both static and dynamic forms on the web page. The subject web page may be found by various methods. In one scenario, an end-user on the Web could submit the web page for crawling after noticing the web page does not occur in search results or after noticing the web page contains forms. Similarly, an automatic analysis tool may analyze a web search log and to find any new parameterized websites that are missing from a particular web index. The automatic analysis tool may go through a web browser history log and find web pages that contain forms for crawling. Additionally, the automatic analysis tool may identify hosts that have low coverage using traditional crawler, and deep crawl those hosts to find pages containing forms.

The form 304 may be hosted by a web page 302 that allows visitors to the page to search for cars. When form 304 is initially loaded by the browser agent, form control 306 may be the only form control that is active, or able to be clicked, selected, or changed. In FIG. 3, form control 306 allows a user to select a value for the make of a car. The browser agent can retrieve a list of the form controls from the web page, and in this scenario, the browser agent will retrieve a list of the makes of car available.

A driver component 308 then analyzes the makes of car available. Additionally, the driver component 308 can decide what value to set for the controls. Data going into the driver component 308 from the website 302 may include actual values and candidate values from the forms on a web page. Data going back to the website 302 from the driver component 308 may include values to input into the forms of the web page.

During the decision making process, the driver component may use a knowledge base 310 to retrieve relevant knowledge to direct its decision making. For example, the knowledge base can use search query logs to initially select the most popular make of car in order to optimize the selection of form control values. The driver component 308 may also consider constraints 312 that are imposed by real world practice. For example, in this scenario, the web site that hosts web page 302 may impose limitations on the number of times the browser agent can access the web page 302. Similarly, the web site may have maximum bandwidth limitations. The utility estimator can make optimal decisions based on constraints imported. In the event there are no constraints imported, the utility estimator may be used to generate popular content. Consider the scenario where one-hundred URLs are to be generated for form 304, while the model form control 314, the maximum price form control 316, and the search within form control 318 are fixed at some value. Utility estimator can make optimal decisions based on imported constraints from the model form control 314, the maximum price form control 316, and the search within form control 318.

Once the driver component 308 has analyzed the controls, the form control values may be sent from the driver component 308 to the browser agent. The browser agent can submit an event to the web page 302 or run any embedded scripted content to trigger operations on the web page corresponding to the form control values received from the driver component 308. The operations on the web page may reveal additional dependent controls for which the driver component can re-fetch values, such as the model form control 314. The model form control 314 corresponds to selecting a model of car after a particular make has been selected. This process may be iteratively repeated until all controls and their dependent controls have been analyzed, or until all resources have been used.

The web site 302 could have been created using an individual "surface" page for each combination of controls. A traditional crawler would be able to access these surface pages, but webmasters create very few links to them. Much of the website's content is hidden by dynamic form controls, and traditional crawler would not access this content. As a result, a traditional crawler may cover a small amount of web pages of a website that uses dynamic form controls. For example, at a website for an online retailer, there are typically thousands of products, such that the retailer may advertise a few products by putting their links on the homepage, with the majority of products having no links pointing to them. The web pages for the majority of products are not accessed by a traditional crawler.

For each form control value, a URL may be sent to the output URL list 320 from the driver component 308. The output URLs can be sent to a generalizer 322 or passed to a downstream component where the content of the URLs may be fetched or serve as seed URLs to a crawler. The generalizer 322 may be used to perform incremental indexing or provide seed URLs by generating other valid URLs through generalizations from the sample URLs from the output URL list 320. The discovery portion 324 of the crawler may include the driver component 308, the knowledge base 310, constraints 312, the output URL list 320, and the generalizer 322.

The generalizer has a number of different uses. In the event that a form control has an infinite number of values, such as a date selection, a parameterized form of the corresponding URL may be indexed. The generalizer may generate the parameterized URL, and web pages may be crawled with placeholders for the infinite values. A value may be submitted to the web page that mimics how an end user of the Web might interact with the page. Once the value is submitted for the infinite, parameterized values, the generalizer may substitute in the definite values to generate output. In the manner, even controls with an infinite number of form control values may be crawled. Additionally, if a particular URL generated by the generalizer is not being clicked on by a large number of end users, the generalizer may send feedback to the knowledge base about the low popularity of the URL. The driver component may then use feedback from knowledge base and penalize those URLs expected utility. Additionally, there may also be positive feedback for URL patterns that are clicked often, so that utility estimator may prioritize those URLs.

The driver component is intelligent in that it selects form control values in the manner of a typical human user. Additionally, the driver component may select values according to its interaction with web sites. Another web site 326 may include a form 328 with a drop down control 330 and a textbox 332 in which a user of the Web could type in keywords. The driver component 308 may populate the textbox 332 with keywords that it selects according to its previous interaction with the website 326. For example, if the website 326 is an online retailer with a large selection of books, and the driver component implements a search for "book" at the website 326, the search may return a large number of results. However, if the driver component implements a search for "insert" at the web site, there may be few results. Accordingly, the driver component can use this information to select keywords to be used in textbox 332. Further, the driver component could also have intelligence to adaptively select values, and the utility estimator may diversify results based on the web log history and the current status of the web site.

Using the knowledge base, the form may first populate with form control values that are popular in the human mind. In FIG. 3, the most popular make may be first selected, followed by the most popular model, the most popular price range, and so forth. Once the initial set of queries is complete, the second most popular form control values within the initial most popular make may be analyzed. As described herein, popularity may be obtained from the knowledge base. Various sources may be included in the knowledge base, including but not limited to, web search logs, knowledge from the internet, certain ontology, and information provided by third parties, such as market researchers. Accordingly, the form control list may be prioritized using the knowledge base and used to fill in forms found by the browser agent.

Figure 4:
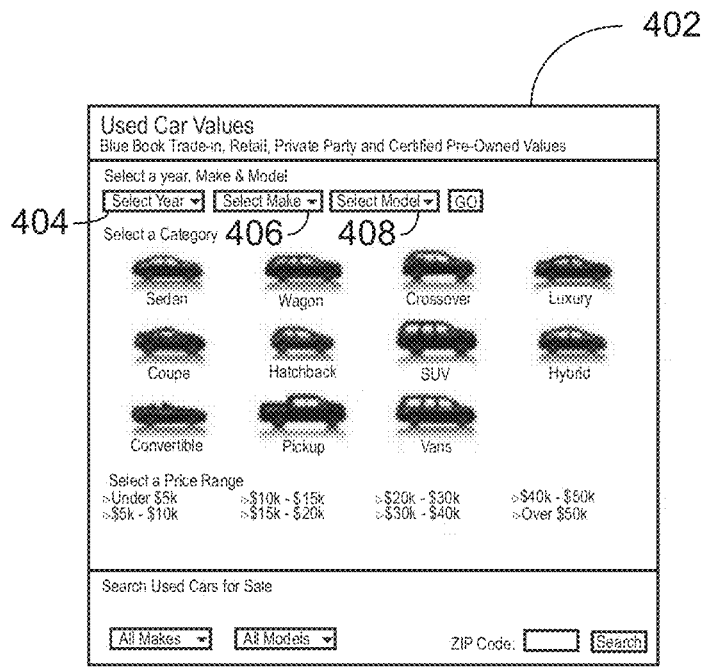
FIG. 4 is a block diagram that is useful in explaining dependent controls according to the subject innovation.

FIG. 4 is a block diagram 400 of a web page that is useful in explaining dependent controls according to the subject innovation. The web page 402 contains controls to select a year form control 404, a make form control 406, and a model form control 408 of a car. The make form control 406 is dependent on the year form control 404. In other words, the make form control 406 cannot be selected until the year form control 404 is selected. Similarly, the model form control 408 is dependent on the make form control 406, and the model form control 408 cannot be selected until the make form control 406 has been selected. Traditional crawlers may be unable to recognize the make form control 406 and the model form control 408. Further, even if traditional crawlers could recognize the make form control 406 and the model form control 408, they may generate a large number of invalid combinations, such as the value "1900" for the year form control 404, or a combination of the value "Honda" for the make 406 with the value "mustang" for the model form control 408. Moreover, if the form is executed using scripted content, traditional crawlers, such as static crawlers, may be entirely unable to recognize the form.

Figure 5:
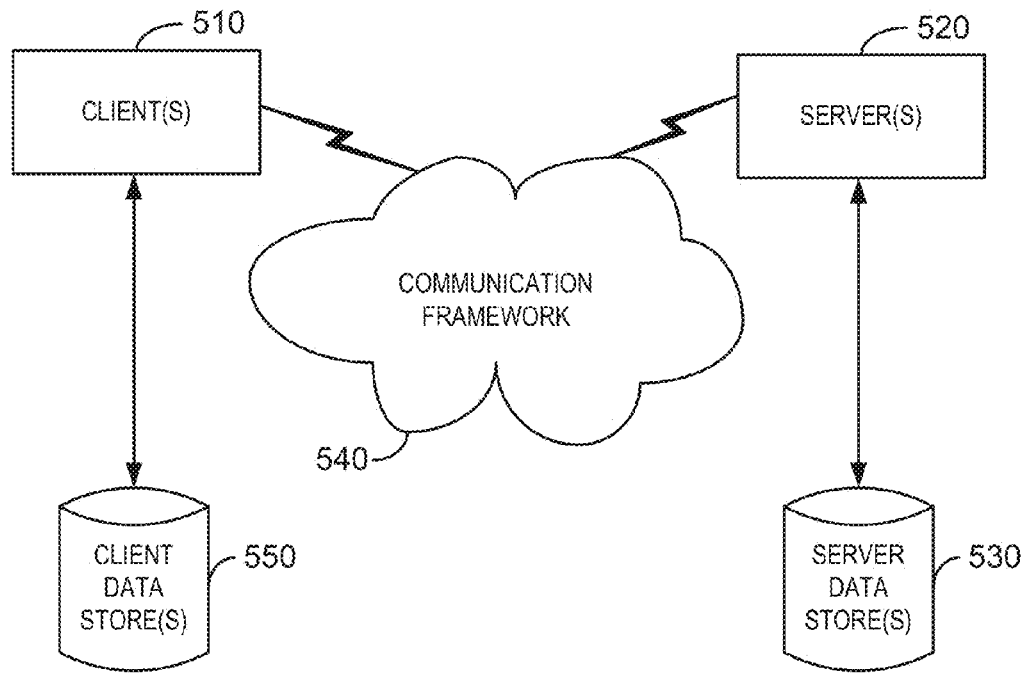
FIG. 5 is a block diagram of an exemplary networking environment wherein aspects of the claimed subject matter can be employed.
Figure 6:
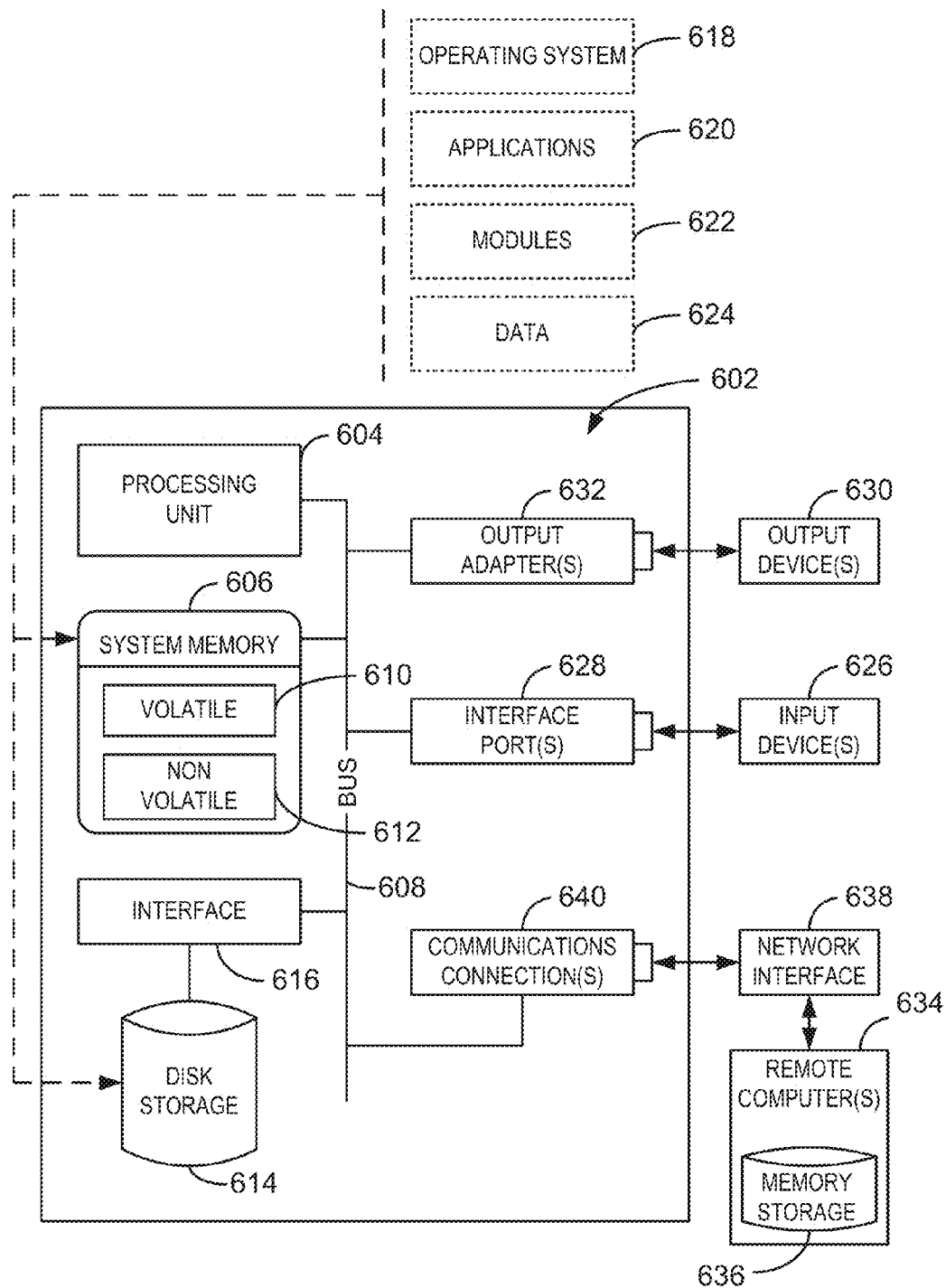
FIG. 6 is a block diagram of an exemplary operating environment that can be employed in accordance with the claimed subject matter.

In order to provide additional context for implementing various aspects of the claimed subject matter, FIGS. 5-6 and the following discussion are intended to provide a brief, general description of a suitable computing environment in which the various aspects of the subject innovation may be implemented. For example, a method for web crawling hidden files, as described in FIG. 2, can be implemented in such a computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the subject innovation may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 5 is a schematic block diagram of a sample-computing system 500 with which web crawling hidden files can be implemented. The system 500 includes one or more client(s) 510. The client(s) 510 can be hardware and/or software (e.g., threads, processes, computing devices). The system 500 also includes one or more server(s) 520. The server(s) 520 can be hardware and/or software (e.g., threads, processes, computing devices).

One possible communication between a client 510 and a server 520 can be in the form of an event submitted to a web page residing on server 520. The event may trigger other controls to become active on the web page. The system 500 includes a communication framework 540 that can be employed to facilitate communications between the client(s) 510 and the server(s) 520. The client(s) 510 are operably connected to one or more client data store(s) 550 that can be employed to store information local to the client(s) 510. Information in the data store(s) 550 may include the web index resulting from web crawling hidden files. The client data store(s) 550 do not have to be in the client(s) 510, but may be located remotely, such as in a cloud server. Similarly, the server(s) 520 are operably connected to one or more server data store(s) 530 that can be employed to store information local to the servers 520. As an example, the client(s) 510 may be computers providing access to the Internet over a communication framework 540. The server(s) 520 may host websites accessed by the client(s) 510.

With reference to FIG. 6, an exemplary environment 600 for implementing various aspects of the claimed subject matter includes a computer 602. The computer 602 includes a processing unit 604, a system memory 606, and a system bus 608. The system bus 608 couples system components including, but not limited to, the system memory 606 to the processing unit 604. The processing unit 604 can be any of various available processors. Dual microprocessors and other multiprocessor architectures also can be employed as the processing unit 604. The system bus 608 can be any of several types of bus structure(s) including the memory bus or memory controller, a peripheral bus or external bus, and/or a local bus using any variety of available bus architectures known to those of ordinary skill in the art.

The system memory 606 may include computer-readable storage media comprising volatile memory 610 and nonvolatile memory 612. The basic input/output system (BIOS), containing the basic routines to transfer information between elements within the computer 602, such as during start-up, is stored in nonvolatile memory 612. By way of illustration, and not limitation, nonvolatile memory 612 can include read only memory (ROM), programmable ROM (PROM), electrically programmable ROM (EPROM), electrically erasable programmable ROM (EEPROM), or flash memory.

Volatile memory 610 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 602 also includes other computer-readable media, such as removable/non-removable, volatile/non-volatile computer storage media. FIG. 6 shows, for example a disk storage 614. Disk storage 614 includes, but is not limited to, devices like a magnetic disk drive, floppy disk drive, tape drive, Jaz drive, Zip drive, LS-100 drive, flash memory card, or memory stick.

In addition, disk storage 614 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 614 to the system bus 608, a removable or non-removable interface is typically used such as interface 616.

It is to be appreciated that FIG. 6 describes software that acts as an intermediary between users and the basic computer resources described in the suitable operating environment 600. Such software includes an operating system 618. Operating system 618, which can be stored on disk storage 614, acts to control and allocate resources of the computer 602.

System applications 620 take advantage of the management of resources by operating system 618 through program modules 622 and program data 624 stored either in system memory 606 or on disk storage 614. It is to be appreciated that web crawling hidden files can be implemented with various operating systems or combinations of operating systems. The browser in which the browser agent operates may be a program module 622.

A user enters commands or information into the computer 602 through input device(s) 626. Input devices 626 include, but are not limited to, a pointing device (such as a mouse, trackball, stylus, or the like), a keyboard, a microphone, a joystick, a satellite dish, a scanner, a TV tuner card, a digital camera, a digital video camera, a web camera, and/or the like. The input devices 626 connect to the processing unit 604 through the system bus 608 via interface port(s) 628. Interface port(s) 628 include, for example, a serial port, a parallel port, a game port, and a universal serial bus (USB).

Output device(s) 630 use some of the same type of ports as input device(s) 626. Thus, for example, a USB port may be used to provide input to the computer 602 and to output information from computer 602 to an output device 630. Information rendered by the subject innovation may appear on an output device 630.

Output adapter 632 is provided to illustrate that there are some output devices 630 like monitors, speakers, and printers, among other output devices 630, which are accessible via adapters. The output adapters 632 include, by way of illustration and not limitation, video and sound cards that provide a means of connection between the output device 630 and the system bus 608. It can be noted that other devices and/or systems of devices provide both input and output capabilities such as remote computer(s) 634.

The computer 602 can be a server hosting a website in a networked environment using logical connections to one or more remote computers, such as remote computer(s) 634. The remote computer(s) 634 may be client systems configured with web browsers, PC applications, mobile phone applications, and the like, to allow users to browse the Internet, as discussed herein. The remote computer(s) 634 can be a personal computer, a server, a router, a network PC, a workstation, a microprocessor based appliance, a mobile phone, a peer device or other common network node and the like, and typically includes many or all of the elements described relative to the computer 602. For purposes of brevity, only a memory storage device 636 is illustrated with remote computer(s) 634. Remote computer(s) 634 is logically connected to the computer 602 through a network interface 638 and then physically connected via a communication connection 640.

Network interface 638 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 640 refers to the hardware/software employed to connect the network interface 638 to the bus 608. While communication connection 640 is shown for illustrative clarity inside computer 602, it can also be external to the computer 602. The hardware/software for connection to the network interface 638 may include, for exemplary purposes only, internal and external technologies such as, mobile phone switches, modems including regular telephone grade modems, cable modems and DSL modems, ISDN adapters, and Ethernet cards.

An exemplary embodiment of the computer 602 may comprise a client computer with a web browser. An exemplary processing unit 604 for the client may be a computing cluster comprising Intel® Xeon CPUs. The disk storage 614 may comprise an enterprise data storage system, for example, holding thousands of user pages.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and/or events of the various methods of the claimed subject matter.

There are multiple ways of implementing the subject innovation, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the subject innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method of web crawling hidden files, comprising:
retrieving a list of form controls from a web page;
retrieving one or more candidate values for one of the form controls;
retrieving an additional form control candidate value for one of the form controls, the additional form control candidate value not being shown in a static HTML description of the web page;
generating form control values for the form controls based on the candidate values and the additional form control candidate value;
submitting an event to the web page using the form control values;
generating a URL for the form control values to crawl for the hidden files; and
generating a plurality of URLs, the plurality of URLs being generated based on one or more constraints, the form control values being generated such that an estimated utility of the form control values is increased, the estimated utility being based on compliance with the constraints.

2. The method recited in claim 1, comprising re-fetching new form control lists and corresponding values for controls that are dependent on a previously retrieved form control until all controls are retrieved.

3. The method recited in claim 1, the form control values being generated based on a knowledge base comprising characterizations of possible form control values.

4. The method recited in claim 3, the characterizations describing historical values from a specific user.

5. The method recited in claim 3, the characterizations describing popular values from a plurality of users.

6. The method recited in claim 1, the URL comprising a seed URL for a crawler.

7. The method recited in claim 1, comprising iteratively generating another URL until a predetermined number of URLs have been generated.

8. A system for web crawling hidden files, the system comprising:
a processing unit; and
a system memory, wherein the system memory comprises code configured to direct the processing unit to:
retrieve a list of form controls from a web page;
retrieve one or more candidate values for one of the form controls;
retrieve an additional form control candidate value for one of the form controls, the additional form control candidate value not being shown in a static HTML description of the web page;
generate form control values for the form controls based on the candidate values and the additional form control candidate value;
submit an event to the web page using the form control values;

generate a URL for the form control values to crawl for the hidden files;

generate a plurality of URLs, the plurality of URLs being generated based on one or more constraints, the form control values being generated such that an estimated utility of the form control values is increased, the estimated utility being based on compliance with the constraints.

9. The system recited in claim 8, the constraints comprising:
a bandwidth threshold that is not exceeded by executing the generated URLs.

10. The system recited in claim 8, one of the form controls comprising a field associated with an infinite number of candidate values, and a parameterized URL is indexed for the field.

11. The system recited in claim 8, the generated URL comprising the parameterized URL with a placeholder for the field, and wherein web pages are crawled with the placeholders.

12. The system recited in claim 8, comprising iteratively generating another URL until all controls and their dependent controls have been analyzed, until a certain number of URLs have been obtained, or until all resources have been used.

13. One or more computer-readable storage media, comprising code configured to direct a processing unit to:
retrieve a list of form controls from a web page;
retrieve one or more candidate values for one of the form controls;
retrieve an additional form control candidate value for one of the form controls, the additional form control candidate value not being shown in a static HTML description of the web page;
generate form control values for the form controls based on the candidate values and the additional form control candidate value;
submit an event to the web page using the form control values;
generate a URL for the form control values to crawl for the hidden files; and
generate a plurality of URLs, the plurality of URLs being generated based on one or more constraints, the form control values being generated such that an estimated utility of the form control values is increased, the estimated utility being based on compliance with the constraints.

14. The one or more computer-readable storage media recited in claim 13, comprising re-fetching web page content, a new list of form controls, and corresponding values for a new control that is dependent upon one of the form controls, until all form controls are executed.

15. The one or more computer-readable storage media recited in claim 13, wherein the form control values are generated based on a knowledge base that provides knowledge relevant to historical values of the form control values and real world constraints.

16. The one or more computer-readable storage media recited in claim 13, comprising a utility estimator to estimate the gain of each form control value.

17. The one or more computer-readable storage media recited in claim 13, the generated URL comprising a seed URL for a crawler.

18. The one or more computer-readable storage media recited in claim 13, comprising iteratively generating another URL until all controls and their dependent controls have been retrieved, until a certain number of URLs have been obtained, or until all resources have been used.

* * * * *